(12) United States Patent
Dasgupta et al.

(10) Patent No.: US 9,374,281 B2
(45) Date of Patent: Jun. 21, 2016

(54) LEARNING MACHINE-BASED MECHANISM TO IMPROVE QOS DYNAMICALLY USING SELECTIVE TRACKING OF PACKET RETRANSMISSIONS

(71) Applicant: Cisco Technology, Inc., San Jose, CA (US)

(72) Inventors: Sukrit Dasgupta, Norwood, MA (US); Jean-Philippe Vasseur, Saint Martin d'Uriage (FR); Grégory Mermoud, Veyras (CH); Jonathan W. Hui, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 181 days.

(21) Appl. No.: 14/164,681

(22) Filed: Jan. 27, 2014

(65) Prior Publication Data

US 2015/0195185 A1    Jul. 9, 2015

Related U.S. Application Data

(60) Provisional application No. 61/923,910, filed on Jan. 6, 2014.

(51) Int. Cl.

| | | |
|---|---|---|
| *H04L 12/24* | (2006.01) | |
| *H04L 12/805* | (2013.01) | |
| *H04W 24/02* | (2009.01) | |
| *H04L 12/751* | (2013.01) | |
| *H04L 12/803* | (2013.01) | |
| *H04L 12/26* | (2006.01) | |
| *H04W 24/04* | (2009.01) | |
| *H04L 12/721* | (2013.01) | |

(52) U.S. Cl.
CPC ............ *H04L 41/5025* (2013.01); *H04L 45/02* (2013.01); *H04L 47/122* (2013.01); *H04L 47/365* (2013.01); *H04W 24/02* (2013.01); *H04L 43/0852* (2013.01); *H04L 45/70* (2013.01); *H04W 24/04* (2013.01)

(58) Field of Classification Search
None
See application file for complete search history.

(56) References Cited

U.S. PATENT DOCUMENTS

| | | |
|---|---|---|
| 6,577,597 B1 | 6/2003 | Natarajan et al. |
| 6,694,471 B1 | 2/2004 | Sharp |
| 6,769,024 B1 | 7/2004 | Natarajan et al. |

(Continued)

OTHER PUBLICATIONS

Fan, N., "Learning Nonlinear Distance Functions Using Neural Network for Regression with Application to Robust Human Age Estimation", IEEE International Conference on Computer Vision (ICCV), Nov. 2011, pp. 249-254, Institute of Electrical and Electronics Engineers, Barcelona, Spain.

(Continued)

*Primary Examiner* — Min Jung
(74) *Attorney, Agent, or Firm* — Parker Ibrahim & Berg LLC; James M. Behmke; Stephen D. LeBarron

(57) ABSTRACT

In one embodiment, a packet to be transmitted along a communication path in a network from a source to a destination is determined, the communication path having one or more hops between the source and the destination. An instruction is sent to one or more tracking nodes along the communication path to track a number of local retransmissions required to successfully transmit the packet from each tracking node to a respective next-hop destination. Then, reports indicating the number of local retransmissions are received from the one or more tracking nodes.

25 Claims, 6 Drawing Sheets

(56) References Cited

U.S. PATENT DOCUMENTS

| | | |
|---|---|---|
| 6,785,239 B1 | 8/2004 | Tasker |
| 6,886,040 B1 | 4/2005 | Fitzgerald |
| 6,961,573 B1 | 11/2005 | Moon et al. |
| 6,973,034 B1 | 12/2005 | Natarajan et al. |
| 7,092,410 B2 | 8/2006 | Bordonaro et al. |
| 7,457,877 B1 | 11/2008 | Shah et al. |
| 7,568,045 B1 | 7/2009 | Agrawal |
| 7,606,895 B1 | 10/2009 | Dini et al. |
| 7,613,128 B2 | 11/2009 | Castagnoli et al. |
| 7,680,047 B2 | 3/2010 | Vadlakonda et al. |
| 7,724,676 B2 | 5/2010 | Gerstel et al. |
| 7,948,910 B2 | 5/2011 | Arbel et al. |
| 8,005,000 B1 | 8/2011 | Srinivasan |
| 8,369,213 B2 | 2/2013 | Vasseur et al. |
| 8,605,591 B2 | 12/2013 | Shaffer et al. |
| 8,630,177 B2 | 1/2014 | Vasseur et al. |
| 8,630,291 B2 | 1/2014 | Shaffer et al. |
| 8,634,314 B2 | 1/2014 | Banka et al. |
| 8,638,778 B2 | 1/2014 | Lee et al. |
| 8,774,164 B2 * | 7/2014 | Klein .................... H04W 36/06 370/338 |
| 2003/0117992 A1 * | 6/2003 | Kim ...................... H04L 1/1835 370/349 |
| 2005/0111487 A1 * | 5/2005 | Matta .................. H04L 12/2602 370/468 |
| 2009/0019147 A1 | 1/2009 | Ahlers et al. |
| 2011/0085461 A1 | 4/2011 | Liu et al. |
| 2012/0155475 A1 | 6/2012 | Vasseur et al. |
| 2012/0233308 A1 | 9/2012 | Van De Houten et al. |
| 2012/0307653 A1 | 12/2012 | Vasseur et al. |
| 2013/0003542 A1 * | 1/2013 | Catovic ............. H04W 28/0236 370/230 |
| 2013/0022053 A1 | 1/2013 | Vasseur et al. |
| 2013/0022083 A1 | 1/2013 | Vasseur et al. |
| 2013/0024560 A1 | 1/2013 | Vasseur et al. |
| 2013/0028103 A1 | 1/2013 | Hui et al. |
| 2013/0121331 A1 | 5/2013 | Vasseur et al. |
| 2013/0159479 A1 | 6/2013 | Vasseur |
| 2013/0159486 A1 | 6/2013 | Vasseur |
| 2013/0159550 A1 | 6/2013 | Vasseur |
| 2013/0201858 A1 | 8/2013 | Varma et al. |
| 2013/0223229 A1 | 8/2013 | Hui et al. |
| 2013/0250811 A1 | 9/2013 | Vasseur et al. |
| 2013/0336126 A1 | 12/2013 | Vasseur et al. |
| 2013/0336316 A1 | 12/2013 | Sudhaakar et al. |
| 2014/0003277 A1 | 1/2014 | Shim |
| 2014/0022928 A1 | 1/2014 | Zingale et al. |
| 2014/0092753 A1 | 4/2014 | Vasseur et al. |
| 2014/0133327 A1 * | 5/2014 | Miyauchi ................ G06F 12/00 370/252 |
| 2014/0215077 A1 * | 7/2014 | Soudan .................. H04L 47/11 709/226 |
| 2014/0293955 A1 * | 10/2014 | Keerthi ............... H04W 72/048 370/330 |

OTHER PUBLICATIONS

Fortunato, S., "Community Detection in Graphs", arXiv:0906.0612v2.pdf [physics.soc-ph]; Physics Reports 486, 75-174, Jan. 2010, 103 pages.

Hui, et al., "An IPv6 Routing Header for Source Routes with the Routing Protocol for Low-Power and Lossy Networks (RPL)", Request for Comments 6554, Mar. 2012, 13 pages, Internet Engineering Task Force Trust.

Newman, et al., "Modularity and Community Structure in Networks", Proceedings of the National Academy of Sciences of the United States of America, Jun. 2006, vol. 103, No. 23, pp. 8577-8582, PNAS, Washington, DC.

Newman, M. E. J., "Analysis of Weighted Networks", http://arxiv.org/pdf/condmat/0407503.pdf, Phys. Rev. E 70, 056131, Jul. 2004, 9 pages.

Siddiky, et al., "An Efficient Approach to Rotation Invariant Face Detection Using PCA, Generalized Regression Neural Network and Mahalanobis Distance by Reducing Search Space", 10th International Conference on Computer and Information Technology, Dec. 2007, 6 pages, Dhaka, Bangladesh.

Ting, et al., "Variational Bayesian Least Squares: An Application to Brain-Machine Interface Data", Neural Networks, vol. 21, Issue 8, Oct. 2008, pp. 1112-1131, Elsevier.

Vasseur, et al., "Routing Metrics Used for Path Calculation in Low-Power and Lossy Networks", Request for Comments 6551, Mar. 2012, 30 pages, Internet Engineering Task Force Trust.

Vasseur, et al., "Learning-Machine-Based Predictive and Proactive Computer Networking and Associated Monitoring", U.S. Appl. No. 61/923,910, filed Jan. 6, 2014, 105 pages, U.S. Patent and Trademark Office, Alexandria, VA.

Winter, et al., "RPL: IPv6 Routing Protocol for Low-Power and Lossy Networks", Request for Comments 6550, Mar. 2012, 157 pages, Internet Engineering Task Force Trust.

* cited by examiner

A BAYESIAN NETWORK REPRESENTING THE JOINT PROBABILITY DISTRIBUTION OVER THREE RANDOM VARIABLES; X, Y, AND Z

BN FOR LINEAR REGRESSION

LEARNING MACHINE-BASED MECHANISM TO IMPROVE QOS DYNAMICALLY USING SELECTIVE TRACKING OF PACKET RETRANSMISSIONS

RELATED APPLICATION

This application claims priority to U.S. Provisional Application No. 61/923,910, filed Jan. 6, 2014, entitled: LEARNING-MACHINE-BASED PREDICTIVE AND PROACTIVE COMPUTER NETWORKING AND ASSOCIATED MONITORING, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
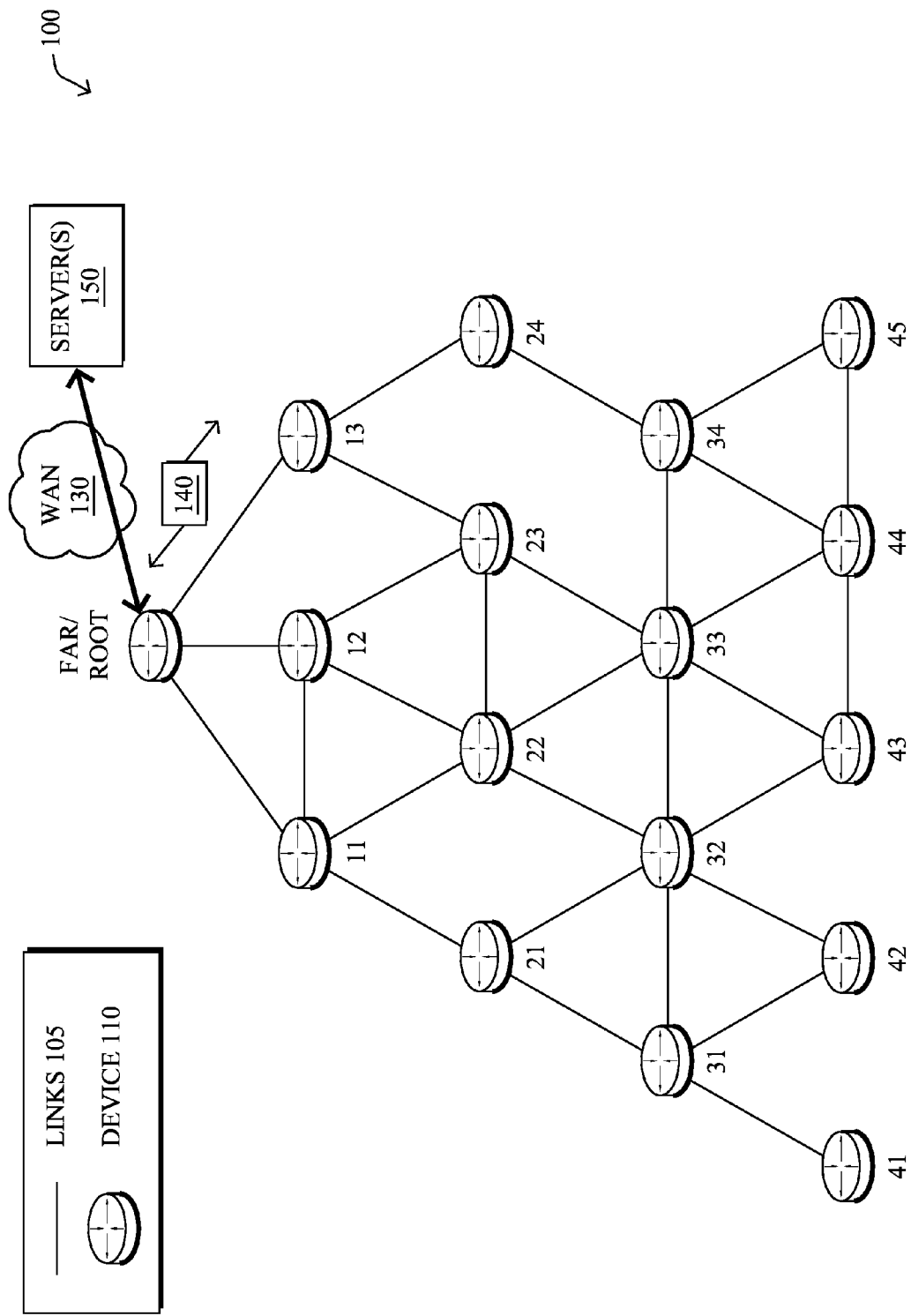
FIG. 1 illustrates an example communication network.

According to one or more embodiments of the disclosure, a packet to be transmitted along a communication path in a network from a source to a destination is determined, the communication path having one or more hops between the source and the destination. An instruction is sent to one or more tracking nodes along the communication path to track a number of local retransmissions required to successfully transmit the packet from each tracking node to a respective next-hop destination. Then, reports indicating the number of local retransmissions are received from the one or more tracking nodes.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12,"... "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
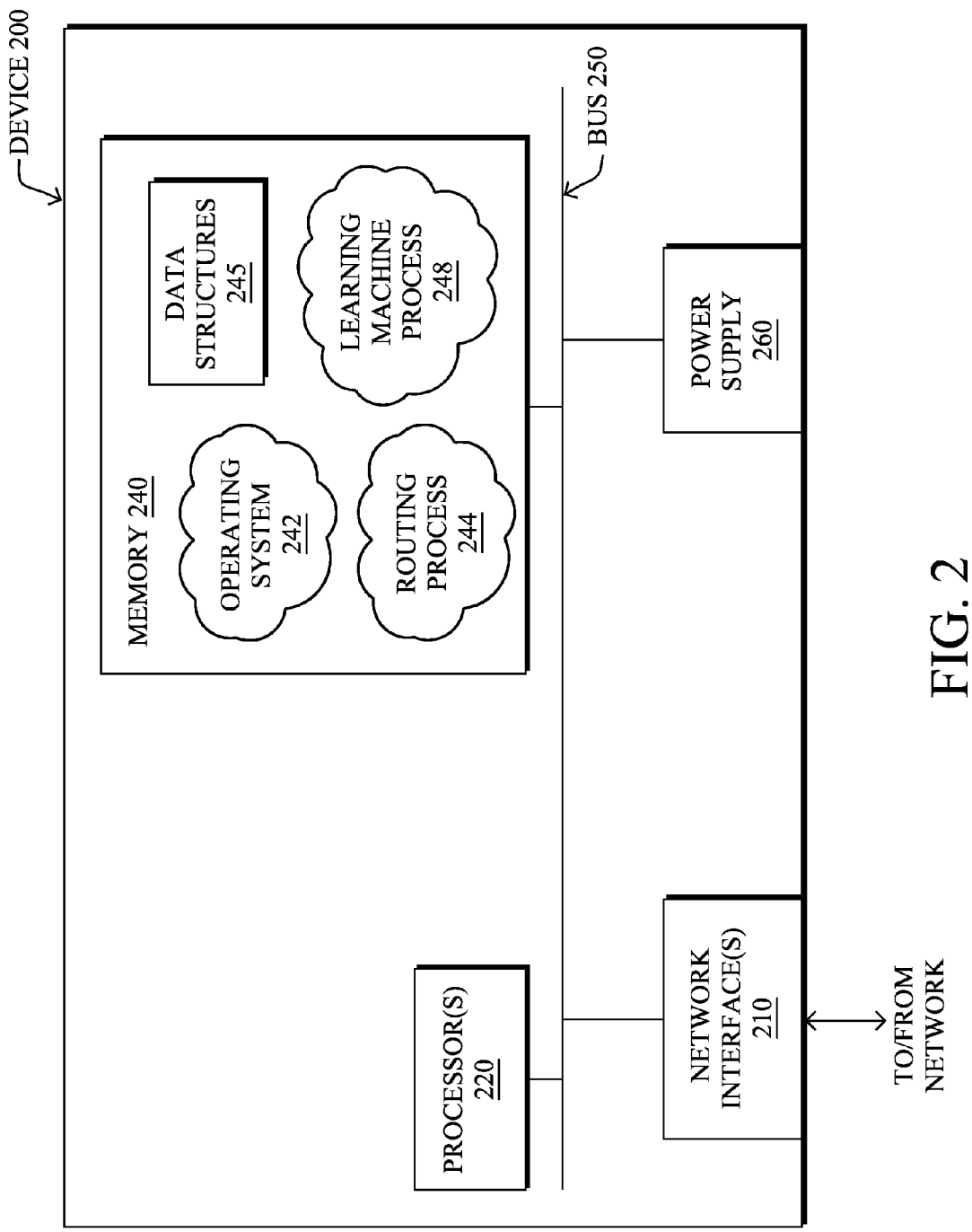
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
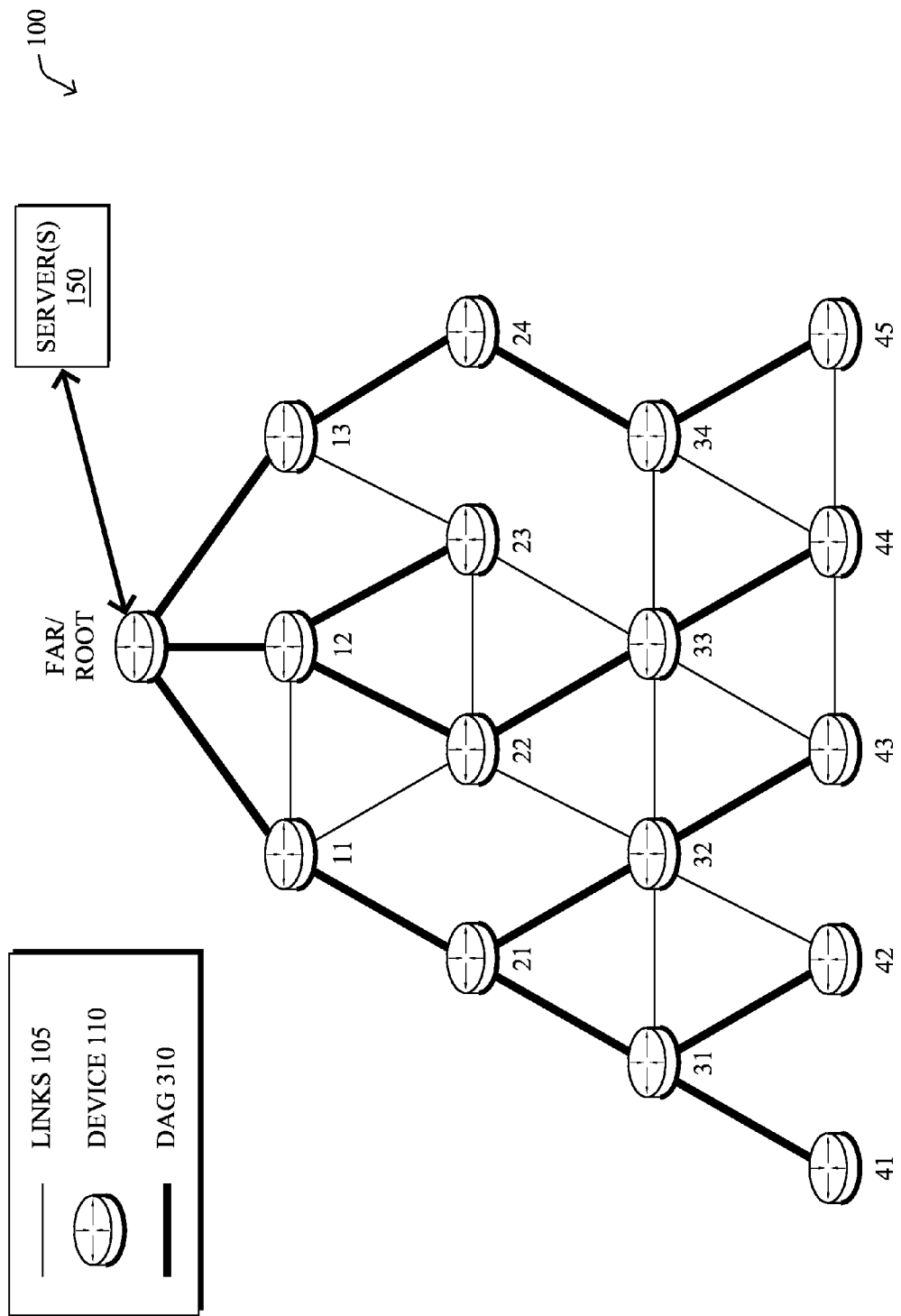
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:
1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.
2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

In particular, many LMs can be expressed in the form of a probabilistic graphical model also called Bayesian Network (BN). A BN is a graph $G=(V,E)$ where V is the set of vertices and E is the set of edges. The vertices are random variables, e.g., X, Y, and Z (see FIG. 4) whose joint distribution $P(X,Y,Z)$ is given by a product of conditional probabilities:

$$P(X,Y,Z)=P(Z|X,Y)P(Y|X)P(X) \quad \text{(Eq. 1)}$$

Figure 4:
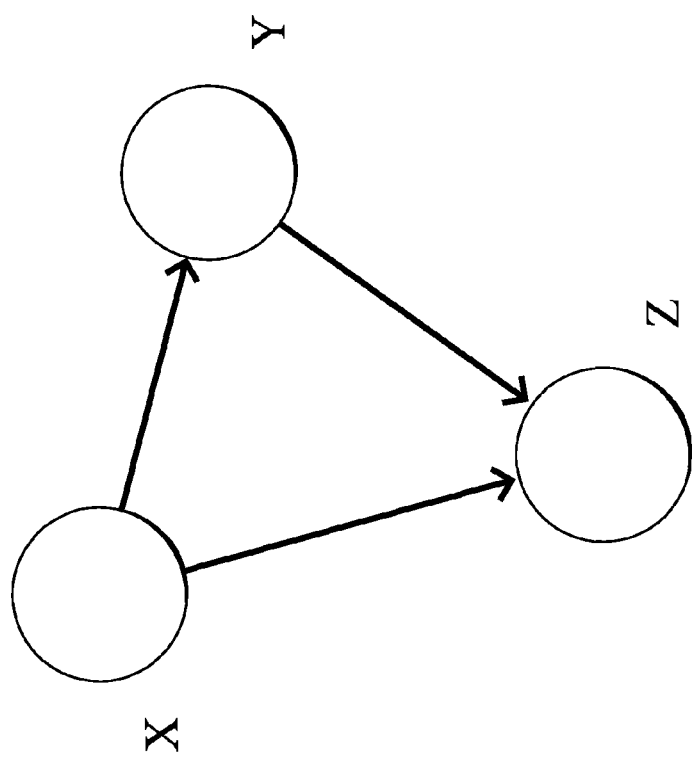
FIG. 4 illustrates an example Bayesian network.

The conditional probabilities in Eq. 1 are given by the edges of the graph in FIG. 4. In the context of LMs, BNs are used to construct the model M as well as its parameters.

To estimate the relationship between network properties of a node I (or link), noted $x_i$, (e.g., hop count, rank, firmware version, etc.) and a given networking metric $M_i$, a linear regression may be performed. More specifically, given the following equation:

$$M_i=F(x_i)=b^T x_i + \epsilon \quad \text{(Eq. 2)}$$

where $x_i$ is a d-dimensional vector of observed data (e.g., end-node properties such as the rank, the hop count, the distance to the FAR, etc.) and $M_i$ is the target metric (e.g., the time to join the network), which is also noted $y_i$ sometimes. Building such a model of a performance metric knowing a set of observed features is critical to perform root cause analysis, network monitoring, and configuration: for example the path delay as a function of the node rank, link quality, etc., can then be used to determine whether anomalies appear in the network and thus take some appropriate actions to fix the issue. In the equation (Eq. 2) above, the term $\epsilon$ is a Gaussian random variable used to model the uncertainty and/or the noise on the estimate $M_i$. The linear regression consists in finding the weight vector b that fulfills the maximum likelihood criterion (which coincides with the least square criterion when $\epsilon$ is Gaussian). In particular, the optimal b must minimize the Mean Squared Error (MSE):

$$\text{MSE}=\Sigma_i(b^T x_i - y_i)^2/N \quad \text{(Eq. 3)}$$

where N is the total number of input data points, i.e., $i=1, \ldots, N$.

In other words, b is a set of weights for each observed value $x_i$, used to compute the function F that provides the value of F. The MSE is a metric used to compute the "quality" of the model function F.

The usual approach to the solving of Eq. (2) is the ordinary least square (OLS) equation, which involves a "d×d" matrix inversion, where d is the number of dimensions. Three main problems arise immediately: (i) the dimensionality of $x_i$ may be large, thus making OLS prohibitively expensive in terms of computational cost (approximately $O(d^3)$), (ii) in presence of co-linearity (i.e., when several node properties are strongly correlated, as it is the case for the hop count and the ETX, for instance), OLS becomes numerically unstable (i.e., round-off and truncation errors are magnified, causing the MSE to grow exponentially), (iii) OLS being essentially non-probabilistic (i.e., it doesn't account for the whole distribution of its constituent variables, but it merely tracks averages), it cannot cope well with noise and outliers, and it is simply not applicable when $\epsilon$ is not Gaussian.

Figure 5:
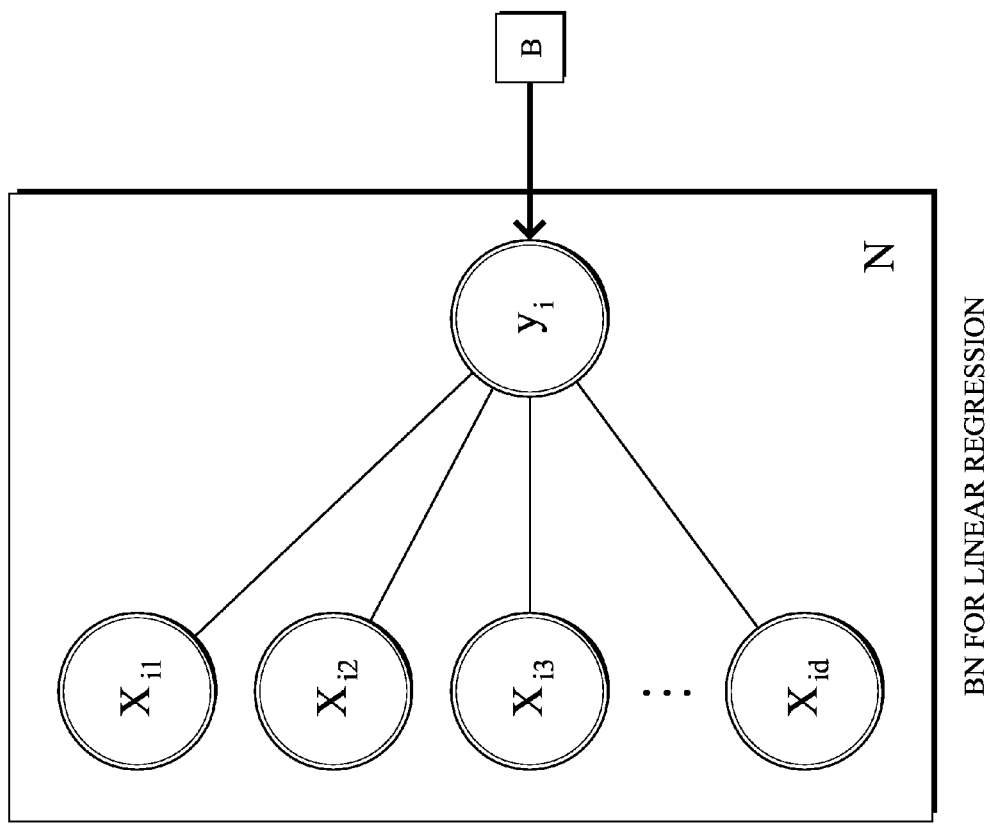
FIG. 5 illustrates an example Bayesian network for linear regression.

To overcome these limitations, the problem can be formulated as a BN (see FIG. 5). Now, all variables are considered as random variables, even though they are all observed at this point: both input variable $x_i$ and the output variable $y_i$ are experimental data, and b is a (non-probabilistic) parameter of the BN at this point. By pushing this approach a little bit further, one may turn b into a random variable as well, and attempt to infer it from experimental data (that is, the observations of $x_i$ and $y_i$). However, this inference problem is non-trivial, especially as one desirable feature of this learning algorithm is that it is capable of identifying non-relevant dimensionalities of x (that is, input dimensions that are weakly correlated with the output x), and automatically set the corresponding weights in b to a zero (or a very small) value.

This problem is solved by one recently proposed algorithm called Variational Bayes Least Square (VBLS) regression (Ting, D'Souza, Vijayakumar, & Schaal, 2010). Namely, this algorithm allows for efficient learning and feature selection in high-dimensional regression problems, while avoiding the use of expensive and numerically brittle matrix inversion. VBLS adds a series of non-observed random variables $z_{ij}$ that can be considered as noisy, fake targets of the factor $b_j \cdot x_{ij}$, and whose sum $\Sigma_j z_{ij}$ is an estimate of $y_i$. In turn, the weights $b_j$ are modeled as random variables, thereby allowing for automated feature detection, i.e., the mean of $b_j$ converges rapidly to zero if no correlation exists between the various $x_{ij}$ and $y_i$.

VBLS estimates the distribution of the non-observed variables $z_i$ and b using a variant of the Expectation Maximization algorithm with a variational approximation for the posterior distributions, which are not analytically tractable. Because it is a fully Bayesian approach, VBLS does not require any parameterization, except for the initial (prior) distributions of hidden parameters, which are set in an uninformative way, i.e., with very large variances that lead to flat distributions.

LM-Based Mechanism to Improve QoS Dynamically Using Selective Tracking of Packet Retransmissions With any wireless media, sending a packet across the channel could involve multiple retransmissions. This is due to the shared nature of the medium where multiple nodes are usually transmitting at the same time and end up causing collisions. In the current architecture, there is no mechanism to determine the number of retransmissions required per packet unless a node specifically notifies a central entity of this particular metric; indeed retransmissions are usually locally handled and related information is kept locally at the MAC layer. Moreover, due to environmental or other network conditions, several nodes might need to retransmit the same packet multiple times at different points in the lifetime of the packet as it traverses through the network.

It is worth noting that retransmissions due to collision or local error rate is a high concern in networks such as LLNs; in many of these networks, paths up to 19 hops and links with Packet Error Rate as close as 40% leads to a large number of retransmissions and consequently delays. Routing metrics are currently additive and very poorly capture such phenomena.

Currently, there is no mechanism to track the number of retransmissions that affect packets on a granular basis (i.e., hop-by-hop). Also, not knowing the number of times a packet has been retransmitted might lead to an incorrect assessment of network conditions. When an LM module is running on a DAG root, knowing the number of retransmissions that each packet experiences is very useful for detecting QoS issues in the topology and isolating areas that are experiencing some sort of a network event that is affecting traffic flow. Accordingly, the techniques herein track the number of retransmissions experienced by a packet, and a Learning Machine (LM) makes use of this information to dynamically tune the topology, thus improving the network use and QoS.

In particular, in the techniques herein, a mechanism to track and report packet retransmissions, or an approximate total number of retransmissions in order to travel from a source to a destination, and improve the QoS based on it is presented. As described below, the first component consists of a mechanism to selectively enable the tracking and reporting feature on the node. This includes the ability to specify custom schedules for sharing the metric as well as thresholds to apply before reporting them. This mechanism can use both multicast and unicast to reach the concerned nodes. The second component is a mechanism to report the metric by the nodes. This is done using a newly defined IPv6 header which carries it. The third component is responsible for improving the QoS of the network based on this metric value. This is done by influencing a change in topology either using PCEs or selective routing control.

First component: This component deals with the enabling of retransmission tracking and reporting functionality on the nodes. As packets traverse the nodes, each node keeps a counter (or more complex forms of reports) for the number of retransmissions that were required to get the packet out of the transmit queue. Based on where the node is located, the likelihood of congestion (and thus the number of retransmissions) can vary significantly. In one embodiment, the LM sends a newly defined CSMP message to specific nodes at multiple depths of the routing tree to request reporting the number of retransmissions. Note that the LM has complete view of the topology (e.g., thanks to the collection of DAO messages in the case of RPL, the Link State Database with ISIS or OSPF) and thus can select nodes that have potential to be a bottleneck topologically or be located in specific areas that suffer from detrimental environmental conditions or exhibits specific conditions (for example, the area is specifically very dense). In another embodiment the LM can select a set of nodes a set of representative nodes in the DAG (at different DAG depth, for different level of density, etc.).

In another embodiment, the LM may decide to track retransmissions for a given path; for example, using an approach for an LM to determine whether traffic of a specific type is within or out of SLA. Thus, the techniques herein specify the ability for the LM to "probe" a given path, for example, a path that is expected not to meet the SLA. In yet another embodiment, the LM can specify certain thresholds in conjunction with the node depth or topological/environmental location such that nodes report only those values that cross these thresholds. Furthermore, instead of using hard-coded thresholds, the LM can also make use of dynamic mechanisms based on observed traffic patterns and topological profiles to generate dynamic thresholds. Using thresholds will ensure that nodes are not reporting retransmission rates all the time, but instead report them only when they are significant enough. Furthermore, reports may be specified for a given period of time, or according to a given schedule.

In order to enable this functionality, the techniques herein specify a newly defined CoAP message which can either be unicast, multicast or broadcast. The CoAP message will carry the following information (encoded as TLVs):

Nature of the "retransmission tracking mechanism" (e.g., a counter);
Schedule (e.g., frequency at which the information should be sent, or time schedule);
(Dynamic) threshold; and
(Optional) List of recipient nodes of this CoAP messages.

Note that although CoAP is certainly a strong network management protocol, especially in the case of LLN, any other management protocol could be used as part of the techniques herein.

In one embodiment, the CoAP message is sent in unicast to a set of N nodes. In another embodiment, the CoAP message is a multicast message addressed to a set of N nodes (in which case the list of recipients could be encoded using a bloom filter), or a broadcast message, should the same message be sent to all nodes in a given broadcast domain.

In Node Tracking (NT) mode, the node is requested to send reports about retransmissions as requested by the LM (according to a specific schedule, time, threshold, etc.). The other mode is referred to as Path Tracking (PT); indeed, it might be useful to track the number of retransmissions along a specific path (for example, if the LM determines that a given path is likely to provide out-of-SLA QoS). In such a case, the request consists in asking the node N to generate a packet destined to the LM that will accumulate the requested information along the path according to the mechanism specified in the second component (by contrast with the NT mode whereby retransmission reports are not updated along the path but they are locally-originated packet destined to the LM).

Moreover, an approximate total number of retransmissions required for the packet to be successfully transmitted from the source to the destination may be calculated based on the reports indicating the number of local retransmissions. This may be performed by, for example, summing the number of local retransmissions at each hop, as reported by the tracking nodes, between the source node and destination node. Also, estimations may be made regarding local retransmissions at various hops, in a scenario where incomplete reports are provided, based on local retransmission reports surrounding the hop with missing data.

Second component: This component deals with the report generation of retransmission numbers. In NT mode, a node will send retransmission updates (according to the requests) to the LM in the form of a CSMP message. In PT mode, once a node receives a notification from the LM, it creates a new optional header in the IPv6 header section and before transmitting the packet, populates it with the latest count. Note that the node may either piggyback the required information in a user packet or it may alternatively originate a new packet. As mentioned in the previous section, this count could be tracked in conjunction with thresholds so not every packet ends up having this optional header. As explained above, in one embodiment the packet may carry the retransmission information corresponding to historical data (e.g., all retransmissions over the past 10 minutes) or specifically for a given packet (e.g., this could be used in order to evaluate at a given time the number of retransmissions for a packet along a path of interest).

In another embodiment, to prevent processing overhead on the node, it could choose to populate the header only every so many retransmission attempts. This will prevent rewriting a header on every transmission attempt there by speeding up the process. With respect to reporting, there are two illustrative embodiments. In one, the node adds the number as well as its own ID such that by the time the packet reaches the LM, it gets a clear picture of which node contributed to the most retransmissions. In the other embodiment, every node could update the count of retransmissions by adding its count to the already present optional header. Each node could then follow up with the LM individually to notify it of the average retransmission count it has been observing from prior nodes, as well as itself using dedicated CSMP metric reporting.

Third component: This component is related to the dynamic modification of the topology as well as QoS changes at the node level induced by the metric observations at the LM. Once the LM starts to build a database of which node experiences most retransmission attempts, or which path is not likely to meet the required SLA, it can take action to remedy or improve the situation in multiple ways.

One approach may consist in re-computing the entire DAG using a Path Computation Element approach. A second approach consists in activating a closed-loop control between the LM, activating retransmissions reports on a set of nodes N and taking (temporary) routing action to selectively modify routing, packet sizes, or next-best hop selection in order to mitigate the issue.

Selective Routing Control: there are circumstances where a node may have to select a best next-hop among a set of candidates that all provide a path of poor quality. For example, referring to FIG. 1, the node 45 may be in a very dense area, leading to a number of retransmissions: detecting such an issue, the LM may trigger the installation of a new path from the node 45 via its sibling. In such a case, the path from node 45 to the root will be 45-44-43-32-21-11 instead of 45-34-24-13, the former route being longer in terms of routing metrics but providing less retransmission, thus a better delay. Note that in this case, the path routing metric should be updated taking into account the local detour. Another situation may arise when a node is being asked to select a different (less preferable from a routing metric perspective) best next hop. For example, the node 42 may be asked to select the node 32 as best next hop, in which case the decision is local, without involving any source routes.

Selective MTU: in another embodiment, if it is observed that specific packet sizes are causing more retransmissions, the LM can ask the node to reduce the size of the packet locally before transmitting them.

Furthermore other link-layer parameters may also be advantageously adjusted such as the backoff/contention window, data rate or even the channel-hopping schedule, etc.). In addition nodes may activate a rate limiter.

Note that in both cases, such temporary solutions, would lead the LM to further monitor the retransmission parameter and dynamically tune parameters setting (thus the notion of control loop).

Figure 6:
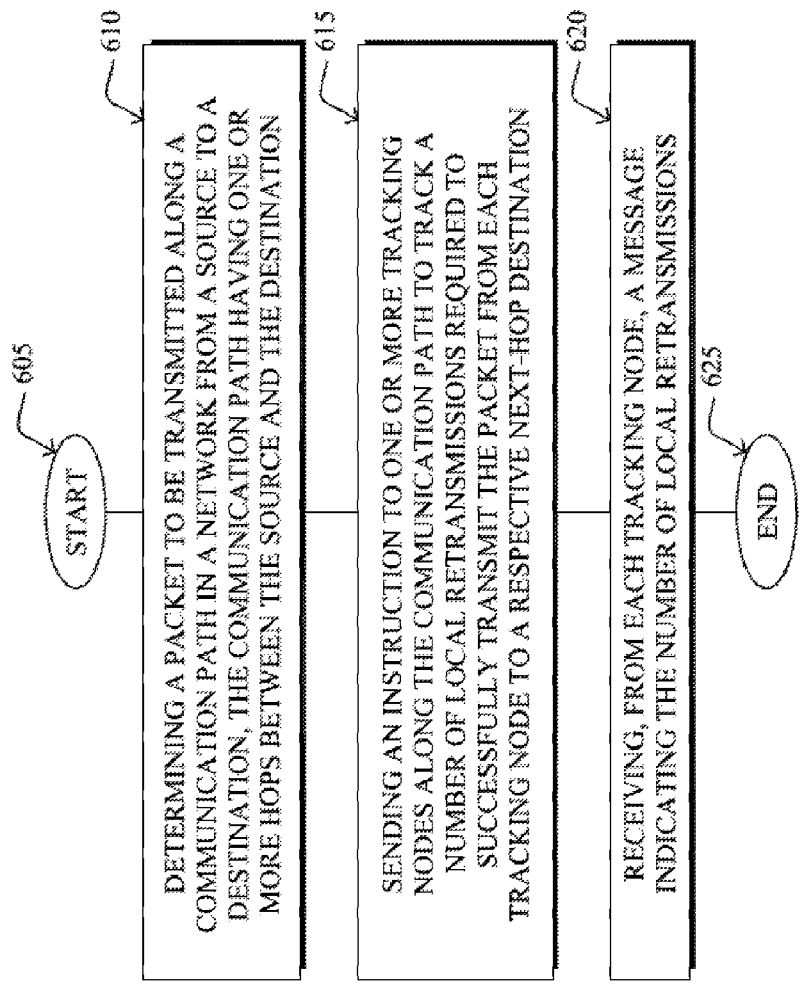
FIG. 6 illustrates an example simplified procedure for a learning machine-based mechanism to improve QoS dynamically using selective tracking of packet retransmissions.

FIG. 6 illustrates an example simplified procedure for a learning machine-based mechanism to improve QoS dynamically using selective tracking of packet retransmissions. The procedure 600 may start at step 605, continue to step 610, and so forth.

At step 610, a packet to be transmitted along a communication path in a network from a source to a destination is determined, the communication path having one or more hops between the source and the destination. As noted above, sending a packet along a communication path, such as a wireless link, can involve multiple retransmissions due to the shared nature of the medium, whereby multiple nodes may be transmitting at the same time and end up causing collisions.

Then, at step 615, an instruction is sent to one or more tracking nodes along the communication path to track a number of local retransmissions required to successfully transmit the packet from each tracking node to a respective next-hop destination. As packets traverse the tracking nodes, each node may track the local retransmissions by keeping a counter (or other suitable tracking mechanism) for the number of retransmissions that were required to get the packet out of the transmit queue. As explained further above, based on where the tracking nodes are located, the likelihood of congestion—and thus, the number of retransmissions—can vary significantly. Accordingly, in one embodiment, the LM may send a message to specific tracking nodes at multiple depths of the routing tree to request reporting the number of retransmissions. Alternatively, the LM may select a set of nodes to act as a set of representative nodes in the DAG, e.g., at different DAG depth, for different level of density, and so forth.

Furthermore, at step 620, reports indicating the number of local retransmissions are received from the one or more tracking nodes. As described above, the LM may send a message to specific tracking nodes at multiple depths of the routing tree to request reporting the number of retransmissions. The message may specify a threshold to ensure that nodes are not reporting retransmission rates constantly, but rather reporting them only when they are significant enough to report. Furthermore, reports may be specified for a given period of time, or according to a given schedule.

The procedure 600 may illustratively end at step 625. The techniques by which the steps of procedure 600 may be performed, as well as ancillary procedures and parameters, are described in detail above.

It should be noted that the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for an LM-based mechanism to improve QoS dynamically using selective tracking of packet retransmissions. In particular, the techniques herein selectively enable retransmission tracking and reporting functionality at the nodes based on their location in the logical topology or physical location. Also, retransmission numbers can be obtained for nodes from a selected path formed by a set of nodes, and schedules can be set for periodic or timer based reporting. Furthermore, threshold-based reporting can also be undertaken for selectively reporting high values only, and retransmission numbers will allow profiling the channel characteristics at various sections of the topology. In addition, based on the techniques herein, nodes can be told by an LM to modify their behavior selectively (such as pick different parents) based on the retransmission characteristics observed, and QoS can be improved based on modifying the DAG behavior based on the retransmission numbers.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

While there have been shown and described illustrative embodiments that provide for learning-machine-based predictive and proactive computer networking and associated monitoring, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining a packet to be transmitted along a communication path in a network from a source to a destination, the communication path having one or more hops between the source and the destination;
   sending an instruction to one or more tracking nodes along the communication path to track a number of local retransmissions required to successfully transmit the packet from each tracking node to a respective next-hop destination; and
   receiving, from the one or more tracking nodes, reports indicating the number of local retransmissions.

2. The method as in claim 1, further comprising:
   dynamically adjusting a routing topology of the network so as to optimize transmission performance based on the reports indicating the number of local retransmissions.

3. The method as in claim 1, further comprising:
   calculating an approximate total number of retransmissions required for the packet to be successfully transmitted from the source to the destination based on the reports indicating the number of local retransmissions.

4. The method as in claim 1, further comprising:
   detecting relatively weak performance levels in the network based on the reports indicating the number of local retransmissions.

5. The method as in claim 4, further comprising:
   identifying a region in the network responsible for the relatively weak performance levels.

6. The method as in claim 1, further comprising:
   sending an instruction to the one or more tracking nodes to report the number of local retransmissions according to a predetermined schedule.

7. The method as in claim 1, further comprising:
   sending an instruction to the one or more tracking nodes to report the number of local retransmissions upon satisfying a predetermined threshold retransmission amount.

8. The method as in claim 1, further comprising:
   sending an instruction to the one or more tracking nodes to track the number of local retransmissions by maintaining a retransmission counter.

9. The method as in claim 1, further comprising:
   adjusting a topology of the network based on the reports indicating the number of local retransmissions in order to improve a network performance metric.

10. The method as in claim 1, further comprising:
    modifying a routing decision in the network based on the reports indicating the number of local retransmissions in order to improve a network performance metric.

11. The method as in claim 1, further comprising:
    adjusting a size of the packet in order to reduce the number of local retransmissions.

12. The method as in claim 1, wherein the number of local retransmissions pertains to a particular node in the network or to a particular communication link in the network.

13. An apparatus, comprising:
    one or more network interfaces that communicate with a network;
    a processor coupled to the one or more network interfaces and configured to execute a process; and
    a memory configured to store program instructions which contain the process executable by the processor, the process comprising:
       determining a packet to be transmitted along a communication path in the network from a source to a destination, the communication path having one or more hops between the source and the destination;
       sending an instruction to one or more tracking nodes along the communication path to track a number of local retransmissions required to successfully transmit the packet from each tracking node to a respective next-hop destination; and
       receiving, from each tracking node, reports indicating the number of local retransmissions.

14. The apparatus as in claim 13, wherein the process further comprises:
    dynamically adjusting a routing topology of the network so as to optimize transmission performance based on the reports indicating the number of local retransmissions.

15. The apparatus as in claim 13, wherein the process further comprises:
    calculating an approximate total number of retransmissions required for the packet to be successfully transmitted from the source to the destination based on the reports indicating the number of local retransmissions.

16. The apparatus as in claim 13, wherein the process further comprises:
    detecting relatively weak performance levels in the network based on the reports indicating the number of local retransmissions.

17. The apparatus as in claim 16, wherein the process further comprises:
    identifying a region in the network responsible for the relatively weak performance levels.

18. The apparatus as in claim 13, wherein the process further comprises:
    sending an instruction to the one or more tracking nodes to report the number of local retransmissions according to a predetermined schedule.

19. The apparatus as in claim 13, wherein the process further comprises:

sending an instruction to the one or more tracking nodes to report the number of local retransmissions upon satisfying a predetermined threshold retransmission amount.

20. The apparatus as in claim 13, wherein the process further comprises:

sending an instruction to the one or more tracking nodes to track the number of local retransmissions by maintaining a retransmission counter.

21. The apparatus as in claim 13, wherein the process further comprises:

adjusting a topology of the network based on the reports indicating the number of local retransmissions in order to improve a network performance metric.

22. The apparatus as in claim 13, wherein the process further comprises:

modifying a routing decision in the network based on the reports indicating the number of local retransmissions in order to improve a network performance metric.

23. The apparatus as in claim 13, wherein the process further comprises:

adjusting a size of the packet in order to reduce the number of local retransmissions.

24. The apparatus as in claim 13, wherein the number of local retransmissions pertains to a particular node in the network or to a particular communication link in the network.

25. A tangible non-transitory computer readable medium storing program instructions that cause a computer to execute a process, the process comprising:

determining a packet to be transmitted along a communication path in a network from a source to a destination, the communication path having one or more hops between the source and the destination;

sending an instruction to one or more tracking nodes along the communication path to track a number of local retransmissions required to successfully transmit the packet from each tracking node to a respective next-hop destination; and receiving, from the one or more tracking nodes, reports indicating the number of local retransmissions.

\* \* \* \* \*